US008374165B2

(12) United States Patent
Yang (10) Patent No.: US 8,374,165 B2
(45) Date of Patent: Feb. 12, 2013

(54) METHOD, APPARATUS, AND COMPUTER PROGRAM PRODUCT FOR COMMUNICATION ROUTING

(75) Inventor: Guang Yang, San Jose, CA (US)

(73) Assignee: Nokia Corporation, Espoo (FI)

( * ) Notice: Subject to any disclaimer, the term of this patent is extended or adjusted under 35 U.S.C. 154(b) by 264 days.

(21) Appl. No.: 12/997,237

(22) PCT Filed: Jun. 9, 2008

(86) PCT No.: PCT/IB2008/052275
§ 371 (c)(1),
(2), (4) Date: Dec. 9, 2010

(87) PCT Pub. No.: WO2009/150490
PCT Pub. Date: Dec. 17, 2009

(65) Prior Publication Data
US 2011/0085565 A1    Apr. 14, 2011

(51) Int. Cl.
*H04L 12/28* (2006.01)
(52) U.S. Cl. ........................................ 370/351; 370/401
(58) Field of Classification Search .................. 370/351, 370/389, 392, 392.31, 401
See application file for complete search history.

(56) References Cited

U.S. PATENT DOCUMENTS

| | | | | |
|---|---|---|---|---|
| 5,517,620 A | * | 5/1996 | Hashimoto et al. | 709/242 |
| 7,333,461 B2 | * | 2/2008 | Thubert et al. | 370/338 |
| 7,894,433 B2 | * | 2/2011 | Ribiere et al. | 370/392 |
| 2004/0117339 A1 | * | 6/2004 | Thubert et al. | 707/1 |
| 2007/0058606 A1 | * | 3/2007 | Koskelainen | 370/351 |

FOREIGN PATENT DOCUMENTS

| | | |
|---|---|---|
| EP | 1185039 A | 3/2002 |
| EP | 1560373 A | 8/2005 |
| EP | 1816801 A | 8/2007 |
| WO | 0124386 A | 4/2001 |

OTHER PUBLICATIONS

International Search Report and Written Opinion of the International Searching Authority for PCT Application No. PCT/IB2008/052275, dated Jan. 19, 2009, 13 pages.
Olsrd, "An adhoc wireless mesh routging daemon" http://www.olsr.org/, retrieved from the Internet on Aug. 30, 2011.
SourceForge—Libpcap: http://sourceforge.net/projects/libpcap/, retrieved from the Internet on Aug. 30, 2011.
Tonnesen et al., "The UniK—OLSR Plugin Library", OLSR Interlop and Workshop, 2004.
IPv4 header: http://en.wikipedia.org/wiki/IPv4, retrieved from the Internet on Aug. 30, 2011.

(Continued)

*Primary Examiner* — Hong Cho
(74) *Attorney, Agent, or Firm* — Nokia Corporation (57) ABSTRACT

An apparatus for communication routing may include a processor. The processor may be configured to receive a packet. In this regard, the packet may include an address of a sending entity. The processor may also be configured to identify the packet as a qualified packet and store a local gateway table entry in a local gateway table to thereby identify a local gateway relationship in response to identifying the qualified packet. In this regard, the local gateway table entry may include the address of the sending entity. The processor may also be configured to update a routing table based on the local gateway table entry. Associated methods and computer program products may also be provided.

20 Claims, 7 Drawing Sheets

OTHER PUBLICATIONS

IP struct: http://en.wikipedia.org/wiki/lp_%28struct%29, retrieved from the Internet on Aug. 30, 2011.
DSR: "The Dynamic Source Routing Protocol", http://www.cs.cmu.edu/~dmaltz/dsr.html, retrieved from the Internet on Aug. 30, 2011.
C. Perkins and P. Bhagwat, "Highly dynamic destination-sequenced distance-vector routing (DSDV) for mobile computers," in Proceedings of ACM SIGCOMM Conference on Communications Architectures,Protocols and Applications, 1994, pp. 234-244.
AODV: http://moment.cs.ucsb.edu/AODV/aodv.html, retrieved from the Internet on Aug. 30, 2011.
GPSR: "Greedy Perimeter Stateless Routing", http://www.icir.org/bkarp/gpsr/gpsr.html, retrieved from the Internet on Aug. 30, 2011.
Pei et al., "Fisheye State Routing in Mobile Ad Hoc Networks", ICDCS Workshop on Wireless Networks and Mobile Computing, pp. D71-D78, 2000.

* cited by examiner

METHOD, APPARATUS, AND COMPUTER PROGRAM PRODUCT FOR COMMUNICATION ROUTING

RELATED APPLICATION

This application was originally filed as PCT Application No. PCT/IB2008/052275 filed Jun. 9, 2008.

TECHNICAL FIELD

Embodiments of the present invention relate generally to communications between devices, and more particularly, relate to an apparatus, method, and a computer program product for routing communications between devices on a network.

BACKGROUND

The modern communications era has brought about a tremendous expansion of wireline and wireless networks. Networking technologies have experienced an unprecedented technological expansion, fueled by consumer demand. In particular, wireless and mobile networking technologies have addressed related consumer demands, while providing more flexibility and immediacy of information transfer.

With the increased expansion of networking technologies, complexities in networking technologies have also arisen. In particular, due to the expansion of networks and the massive number of devices that may be connected to various networks, complexities in communications routing have arisen. To resolve issues with communications routing, conventional network devices may include communications routing software to facilitate the routing of communications within the network. Often these software implemented routing solutions may come pre-installed on all network devices. The solutions may implement a protocol that provides for determining which devices are currently connected to the network and pathways between these various network entities as well as for sharing this information.

However, complexities can arise when network devices are not pre-installed with communications routing software. In particular, complexities can arise when a device without pre-installed communications routing software desires to communicate through a first network device to a second network device (i.e., multi-hopping). In particular, issues with regard to communication routing when no communication routing software is installed on some or all network devices may pose issues for social proximity network (SPN) environments.

In an SPN environment, network devices, such as, for example, cellular telephones, may communicate with each other when the network devices are within a particular proximity with each other. For example, the proximate area may encompass a shopping mall, a downtown city block, a restaurant, a theme park, or the like. SPNs also add complexity due to the fact that networked devices may be mobile and therefore a device's connection to the network may be dynamic, adding to the complexity of communication routing.

Accordingly, it may be desirable to develop a mechanism that may provide for communications routing on communications networks. In particular, it may be desirable to provide a mechanism for providing communications routing on networks that may include devices that do not include installed communication routing software.

BRIEF SUMMARY

A method, apparatus, and computer program product are therefore described that provide for communication routing. In particular, exemplary embodiments of the present invention may be used to determine a default gateway of a device. In this regard, exemplary embodiments may receive a packet of information, where the packet includes an address of a sending entity. The packet may be analyzed to identify whether the packet is a qualified packet. In some exemplary embodiments, a series of inquiries may be satisfied to determine if a packet is qualified. If the packet is qualified, the address of the sending entity may be stored in a local gateway table indicating that a default gateway has been identified. Exemplary embodiments of the present invention may also provide for transmission of the local gateway table in response to a timer reaching a timer threshold to facilitate network-wide communication routing.

In one exemplary embodiment, a method for communication routing is described. The exemplary method may include receiving a packet. In this regard, the packet may include an address of a sending entity. The exemplary method may also include identifying the packet as a qualified packet and storing a local gateway table entry in a local gateway table to thereby identify a local gateway relationship in response to identifying the qualified packet. In this regard, the local gateway table entry may include the address of the sending entity. The exemplary method may also include updating a routing table based on the local gateway table entry.

In another exemplary embodiment, an apparatus for communication routing is described. The apparatus may include a processor. The processor may be configured to receive a packet. In this regard, the packet may include an address of a sending entity. The processor may also be configured to identify the packet as a qualified packet and store a local gateway table entry in a local gateway table to thereby identify a local gateway relationship in response to identifying the qualified packet. In this regard, the local gateway table entry may include the address of the sending entity. The processor may also be configured to update a routing table based on the local gateway table entry.

In another exemplary embodiment, a computer program product for communication routing is described. The computer program product may include at least one computer-readable storage medium having computer-readable program code portions stored therein. The computer-readable program code portions may include a first program code portion, a second program code portion, a third program code portion, and a fourth program code portion. The first program code portion may be configured to receive a packet. In this regard, the packet may include an address of a sending entity. Further, the second program code portion may be configured to identify the packet as a qualified packet, and the third program code portion may be configured to store a local gateway table entry in a local gateway table to thereby identify a local gateway relationship in response to identifying the qualified packet. In this regard, the local gateway table entry may include the address of the sending entity. The fourth program code portion may be configured to update a routing table based on the local gateway table entry.

In another exemplary embodiment, an apparatus for communication routing is described. The exemplary apparatus may include means for receiving a packet. In this regard, the packet may include an address of a sending entity. The exemplary apparatus may also include means for identifying the packet as a qualified packet and means for storing a local gateway table entry in a local gateway table to thereby identify a local gateway relationship in response to identifying the qualified packet. In this regard, the local gateway table entry may include the address of the sending entity. The exemplary apparatus may also include means for updating a routing table based on the local gateway table entry.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Further, the term "exemplary" as used herein is defined to indicate an example, and should not be construed to indicate a qualitative assessment.

Figure 1:
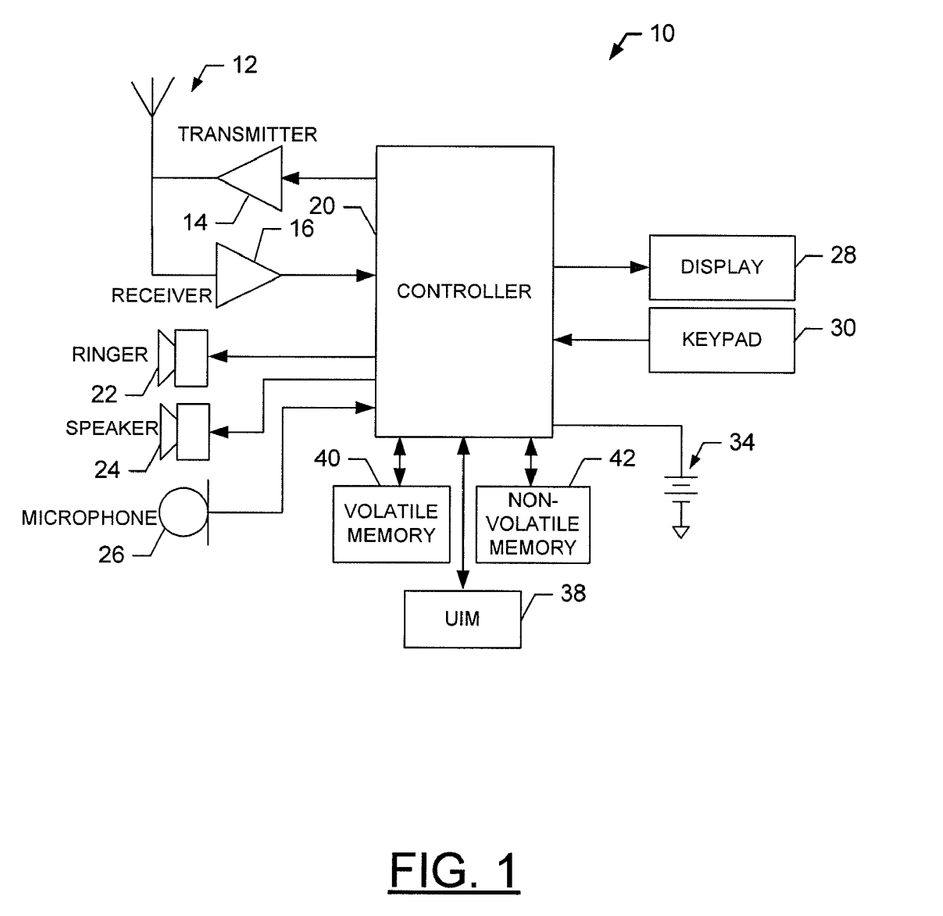
FIG. 1 is a schematic block diagram of a mobile terminal according to an exemplary embodiment of the present invention.

FIG. 1 illustrates a block diagram of a mobile terminal 10 that could benefit from, and may be an exemplary apparatus that incorporates embodiments of the present invention. It should be understood, however, that a mobile telephone as illustrated and hereinafter described is merely illustrative of one type of mobile terminal that could benefit from embodiments of the present invention and, therefore, should not be taken to limit the scope of embodiments of the present invention. While several embodiments of the mobile terminal 10 are illustrated and will be hereinafter described for purposes of example, other types of mobile terminals, such as portable digital assistants (PDAs), pagers, mobile televisions, gaming devices, mobile computers, laptop computers, cameras, video recorders, audio/video player, radio, GPS devices, or any combination of the aforementioned, and other types of voice and text communications systems, can readily employ embodiments of the present invention.

In addition, while several embodiments of the method of the present invention may be performed or used by a mobile terminal 10, the method may be employed by other than a mobile terminal. Moreover, the apparatus and method of embodiments of the present invention will be primarily described in conjunction with mobile communications applications. It should be understood, however, that the apparatus and method of embodiments of the present invention can be utilized in conjunction with a variety of other applications, both in the mobile communications industries and outside of the mobile communications industries.

The mobile terminal 10 may include an antenna 12 (or multiple antennas) in operable communication with a transmitter 14 and a receiver 16. The mobile terminal 10 may further include an apparatus, such as a controller 20 or other processing element that provides signals to and receives signals from the transmitter 14 and receiver 16, respectively. The signals may include or be representative of signaling information in accordance with the air interface standard of the applicable cellular system, and also user speech, received data and/or user generated data. In this regard, the mobile terminal 10 may be capable of operating with one or more air interface standards, communication protocols, modulation types, and/or access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9 generation (3.9G) wireless communication protocols, such as Evolved Universal Terrestrial Radio Access Network (E-UTRAN), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN), or other communication networks. Further, the mobile terminal 10 may communicate in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like.

It is understood that the apparatus, such as the controller 20, may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 may be allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface that may include an output device such as a conventional earphone or speaker 24, a ringer 22, a microphone 26, a display 28, and/or a user input interface, all of which may be coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and/or other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 may further include a battery 34, such as a vibrating battery pack, for powering various circuits that are required to operate the mobile terminal 10, as well as, optionally providing mechanical vibration as a detectable output.

The mobile terminal 10 may further include a user identity module (UIM) 38. The UIM 38 may be a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 may store information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an electrically erasable programmable read only memory (EEPROM), flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which may determine an identity of the current cell, i.e., cell id identity or cell id information, with which the mobile terminal 10 is in communication.

Figure 2:
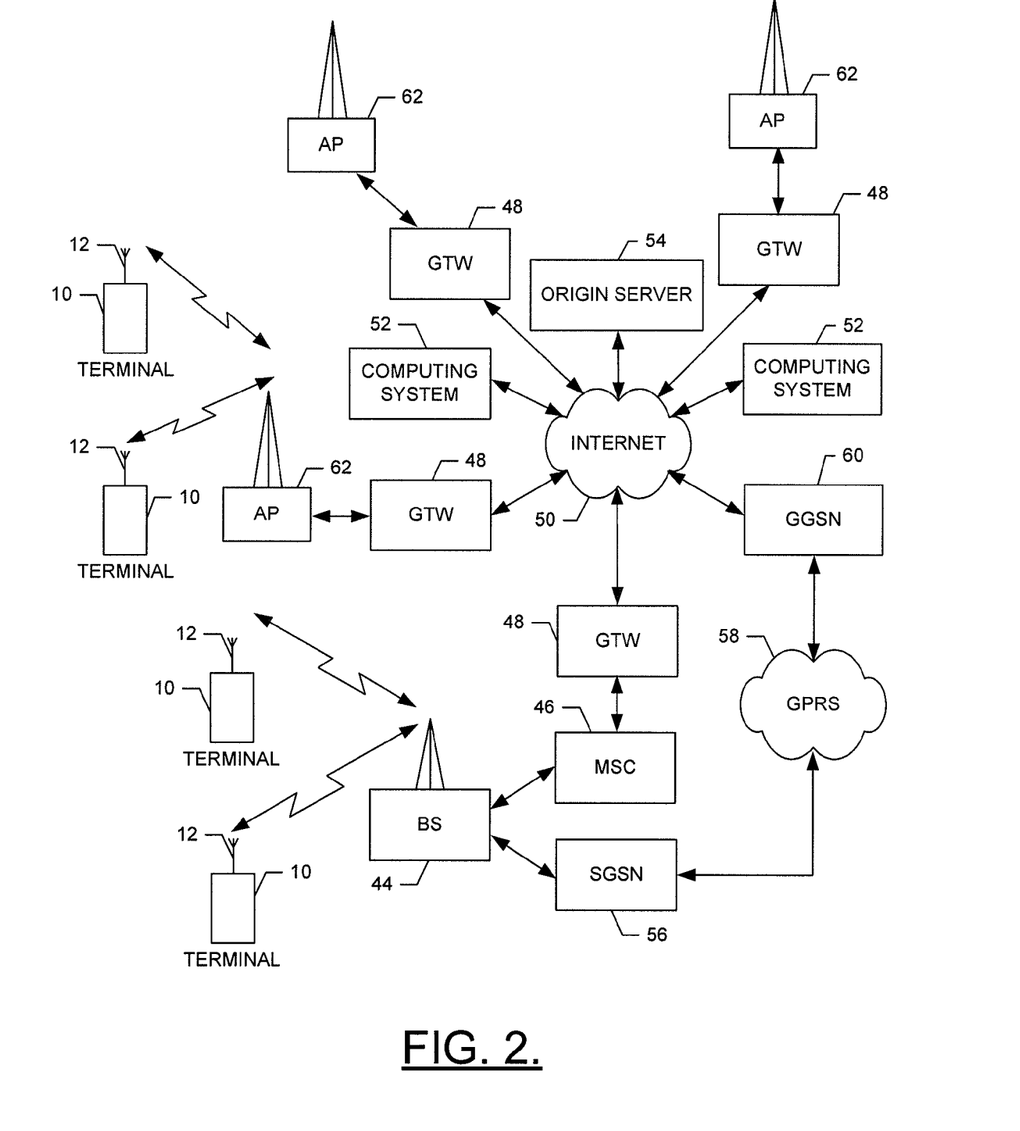
FIG. 2 is a schematic block diagram of a wireless communications system according to an exemplary embodiment of the present invention.

FIG. 2 is a schematic block diagram of a wireless communications system that may include or support exemplary embodiments of the present invention. The system may include a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which may includes elements required to operate the network, such as a mobile switching center (MSC) 46. In operation, the MSC 46 may be capable of routing calls or other communications to and from the mobile terminal 10 when the mobile terminal 10 is making and receiving calls or communications. The MSC 46 may also provide a connection to landline trunks when the mobile terminal 10 is involved in a call. In addition, the MSC 46 may be capable of controlling the forwarding of messages to and from the mobile terminal 10, and may also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 may be coupled to a data network, such as a local area network (LAN), a metropolitan area network (MAN), and/or a wide area network (WAN). The MSC 46 may be directly coupled to the data network. In one exemplary embodiment, the MSC 46 may coupled to a gateway device (GTW) 48, and the GTW 48 may be coupled to a WAN, such as the Internet 50. In turn, devices such as processing elements (e.g., personal computers, server computers or the like) may be coupled to the mobile terminal 10 via the Internet 50. For example, as explained below, the processing elements may include one or more processors associated with a computing system 52 (two shown in FIG. 2), origin server 54 (one shown in FIG. 2) or the like, as described below.

The BS 44 may also be coupled to a serving GPRS (General Packet Radio Service) support node (SGSN) 56. The SGSN 56 may be capable of performing functions similar to the MSC 46 for packet switched services. The SGSN 56, like the MSC 46, may be coupled to a data network, such as the Internet 50. The SGSN 56 may be directly coupled to the data network. In some exemplary embodiments, the SGSN 56 may be coupled to a packet-switched core network, such as a GPRS core network 58. The packet-switched core network may be coupled to another GTW 48, such as a gateway GPRS support node (GGSN) 60, and the GGSN 60 may be coupled to the Internet 50. In addition to the GGSN 60, the packet-switched core network may also be coupled to a GTW 48. Also, the GGSN 60 may be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) may be capable of supporting communication in accordance with 2G wireless communication protocols IS-136 (TDMA), GSM, and IS-95 (CDMA). Also, for example, one or more of the network(s) may be capable of supporting communication in accordance with 2.5G wireless communication protocols GPRS, Enhanced Data GSM Environment (EDGE), or the like. Further, for example, one or more of the network(s) may be capable of supporting communication in accordance with 3G wireless communication protocols, such as a UMTS network employing WCDMA radio access technology, and/or 4G wireless communication protocols. Some narrow-band analog mobile phone service (NAMPS), as well as total access communication system (TACS), network(s) may also benefit from embodiments of the present invention, as should dual or higher mode mobile stations (e.g., digital/analog or TDMA/CDMA/analog phones).

The mobile terminal 10 may be further coupled to one or more wireless access points (APs) 62. The APs 62 may comprise access points configured to communicate with the mobile terminal 10 in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like. The APs 62 may be coupled to the Internet 50. Like with the MSC 46, the APs 62 may be directly coupled to the Internet 50. In one embodiment, however, the APs 62 are indirectly coupled to the Internet 50 via a GTW 48. Furthermore, in one embodiment, the BS 44 may be considered as another AP 62. In some exemplary embodiments, the system may support communications between the mobile terminal 10 and another network entity within a social proximity network (SPN) as described below. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. One or more of the computing systems 52 can additionally, or alternatively, include a removable memory capable of storing content, which may thereafter be transferred to the mobile terminal 10. Further, the mobile terminal 10 may be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including universal serial bus (USB), LAN, WLAN, WiMAX, UWB techniques and/or the like.

In an exemplary embodiment, content or data may be communicated over the system of FIG. 2 between a mobile terminal, which may be similar to the mobile terminal 10 of FIG. 1, and a network device of the system of FIG. 2 in order to, for example, execute applications or establish communication (for example, for purposes of content or information sharing) between the mobile terminal 10 and other mobile terminals. As such, it should be understood that the system of FIG. 2 need not be employed for communication between mobile terminals or between a network device and the mobile terminal, but rather FIG. 2 is merely provided for purposes of example. Furthermore, it should be understood that embodiments of the present invention may be resident on a communication device such as the mobile terminal 10, and/or may be resident on a server, personal computer, or other electronic device, absent any communication with the system of FIG. 2.

Figure 3A:
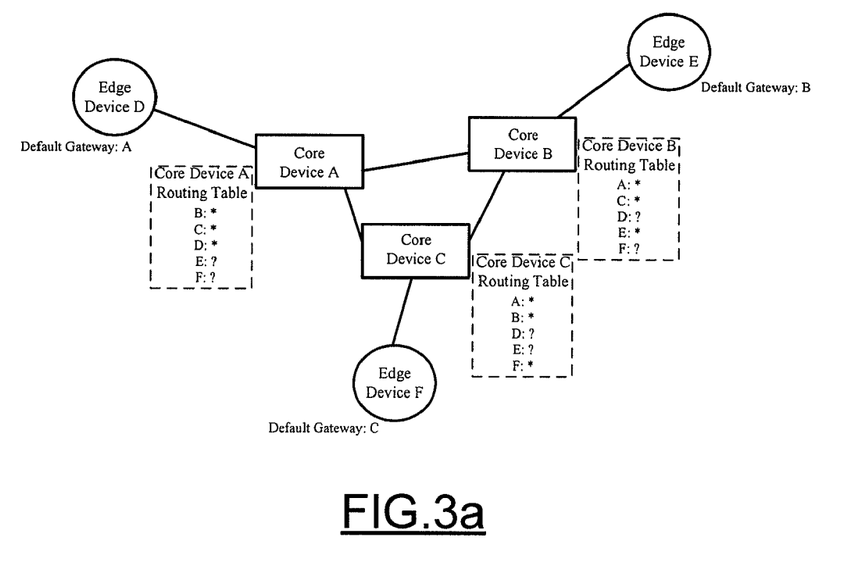
FIGS. 3a and 3b are schematic block diagrams of systems of network entities according to exemplary embodiments of the present invention.
Figure 3B:
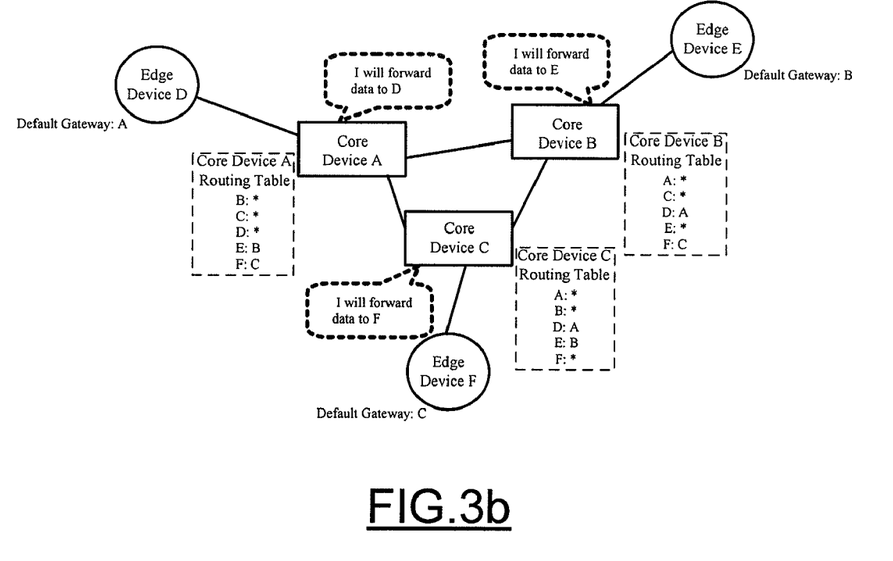

FIGS. 3a and 3b depict block diagrams of exemplary communications networks according to various exemplary embodiments of the present invention. In some exemplary embodiments, the communications networks of FIGS. 3a and 3b may be social proximity networks. Further, in some exemplary embodiments, the networks of FIGS. 3a and 3b may be implemented within or otherwise supported by the system of FIG. 2.

In this regard, a social proximity network may be wireless network where the proximity of a network device to another network device may determine the topology of the network. Further, SPNs may leverage network infrastructure or ad-hoc device-to-device connectivity to conduct communications. An SPN utilizing an infrastructure mode may have ease of use as an advantage. On the other hand, an SPN operating in an ad-hoc device-to-device mode may have the advantages of independence of infrastructure coverage, no or low cost, and low overhead.

The networks of FIGS. 3a and 3b may be SPNs operating in an ad-hoc mode. In this regard, the networks may include core devices and edge devices. Core devices within the network may operate as gateways for the edge devices. A core device may run specialized routing software that can communicate with other core devices running the same routing software and exchange topological information of the network to set up routing paths. Further, a core device may maintain a gateway and routing table to facilitate communications routing according to various embodiments of the present invention. The gateway table may include entries which indicate the edge devices that are directly connected to or otherwise accessing the network via a core device (i.e., edge devices using the core device as a default gateway). Further, the routing table may include entries that indicate where communications should be routed to facilitate transfer of the communication to a final destination within the network. For example, a routing table may include an entry that indicates that all communications directed to Device E should be forwarded to Device B for further routing by Device B.

An edge device, on the other hand, may be any wireless communications device, such as, for example, the mobile terminal 10. Further, an edge device may be any off-the-shelf device with Wi-Fi capability. An edge device may connect to the network through a core device. In this regard, an edge device may operate with respect to a core device as if the core device was a gateway. Further, an edge device need not include communications routing software or other complex configurations and/or extra software requirements.

In connecting to an SPN network in an ad-hoc mode, an edge device may use any core device as a gateway. In this regard, in some instances, the edge device may access the network via the core device that is in closest proximity to the edge device. However, since an edge device may be mobile, the edge device may move to a location proximate to another core device and that core device may then become the edge device's gateway to the network. As such, due the mobility, and unpredictable connectivity of the edge device, communications routing to the edge device may be problematic.

To remedy the unpredictable connectivity of the edge devices, exemplary embodiments of the present invention identify a core device as a default gateway for an edge device, and then share connectivity information to other core devices on the network to facilitate communications routing. By sharing the connectivity information, a core device may notify other core devices that communications directed to an edge device that is currently using the core device as a default gateway may be forwarded to the core device for further routing to the edge device. In some embodiments, each core device on the network may continuously update, at regular or irregular intervals, the connectivity of the network to facilitate communications routing.

The networks of FIGS. 3a and 3b include core devices and edge devices. As an example, the core devices may include Core Device A, Core Device B, and Core Device C. The edge devices may include Edge Device D, Edge Device E, and Edge Device F. With regard to the topology of the networks of FIGS. 3a and 3b, the core devices have connections to each other. Each edge device may be connected to a single core device. In this regard, Edge Device D is connected to Core Device A, Edge Device E is connected to Core Device B, and Edge Device F is connected to Core Device C.

FIG. 3a may represent the initial condition of the network. Since the edge devices need not include any communication routing capabilities, the core devices may initially be unaware of the connectivity of edge devices that are not directly connected to the core device (i.e., one hop neighbors). For example, initially, Core Device A may be aware of a direct connection with Edge Device D, but Core Device A may be unaware of the connectivity of Edge Device E and Edge Device F. The routing table associated with Core Device A (i.e., Core Device A Routing Table) indicates Core Device A's initial connectivity awareness. In this regard, Core Device A may be aware of direct connections with Edge Device D, Core Device B, and Core Device C (as indicated in FIG. 3a by the asterisk "*" in the Core Device A Routing Table). Core Device A may not be aware of the connectivity of Edge Device E and Edge Device F (as indicated in FIG. 3a by the question mark "?" in the Core Device A Routing Table). Core Device B and Core Device C have similar connectivity awareness as indicated by the associate routing tables.

According to an exemplary embodiment of the present invention, to facilitate communication routing, the routing tables for each core device may be populated. To populate the routing tables, each core device may be configured to determine which edge devices are treating the core device as a default gateway. A default gateway may be the core device that an edge device is currently using for access to the network.

Since an edge device connected to the network, such as an SPN, may unilaterally choose a default gateway, a core device may not be aware that the core device has been chosen by the edge device to be a default gateway. As such, the core device may determine that the edge device has chosen the core device as a default gateway without the edge device explicitly communicating this to the core device. In some exemplary embodiments, an edge device may choose a core device to be a default gateway by resolving an anycast internet protocol (IP) address 10.0.0.1 to the media access control (MAC) address of a core device (e.g., a proximate core device).

To determine whether an edge device is using the core device as a default gateway, the core device may capture or receive a packet (i.e., an incoming data packet) and determine whether the packet is a qualified packet. In some exemplary embodiments, use of a libpcap library tool, which may be a system-independent interface for user-level packet capture may facilitate determination of a default gateway. With regard to capturing or receiving a packet, a core device may be configured to capture or receive some or all incoming packets and analyze the packets to determine if the packets are qualified.

With regard to analyzing the captured or received packet, various data within the packet, or associated with the packet, may be analyzed. In some exemplary embodiments, a packet may include some or all of a source address (e.g., a source IP address), a source device address (e.g., a source MAC address), a destination device address (e.g., a destination MAC address), and protocol information. The data may be included in a header, body, or elsewhere within the packet. The protocol information may be determined from the packet or a port utilized in association with the packet.

For a packet to qualify, the packet may originate directly from an edge device, using a qualified protocol, and be targeted for a core device. If these criteria are met, then the packet may indicate that an edge device is using a core device as a default gateway. In determining whether a packet meets these criteria, a core device may be configured to determine whether the packet originated from an edge device. In this regard, a source address (e.g., a source IP address) may be analyzed to determine whether the packet originated from an edge device. Edge devices may operate in a different network or sub-network (i.e., subnet) than the core devices. As such, if a packet originated from an edge device, the source address may indicate that the originator of the packet is a member of a network for edge devices.

The analysis of the captured packet may further include determining whether the packet was sent directly from the source device (i.e., the packet did not travel through an intermediate device). In this regard, the source address (e.g., source IP address) and a source device address (e.g., source MAC address) may be analyzed. In some exemplary embodiments, if the source address and the device address are associated with the same device, then the packet was received directly from the source. Further, in some exemplary embodiments, the address resolution protocol (ARP) cache may be analyzed to determine whether the packet was received directly from the source. In this regard, an ARP solicitation may be utilized to determine whether the packet was received directly from the source.

Further, the packet may be analyzed to determine whether the destination device address of the packet is the device address of the core device to determine if the core device is the device layer destination (i.e., single hop destination). In this regard, in some exemplary embodiments, a packet may include a destination device address (e.g., a MAC address at the device layer), which may be used to indicate the device address of the receiving entity of the packet, and a final destination address (e.g., an IP address), which may be used to indicate the address of the final destination of the packet (i.e., the intended ultimate target). In some exemplary embodiments, a destination device address that is a MAC address from the packet may be compared with the MAC address of the core device to determine if the core device is the device layer destination. Moreover, a device address of the core device (e.g., a MAC address of the core device) may be compared to a destination device address of the packet. If the device address of the core device matches the destination device address of the packet, then the core device may be the device layer destination for the packet (i.e., a single hop destination).

Additionally, the packet may be analyzed to determine if a qualified protocol was used. In this regard, if transmission control protocol (TCP) or domain name system (DNS) over user datagram protocol (UDP) is utilized in association with the packet, then the packet may be considered to utilize a qualified protocol. The headers of the packet may be analyzed to determine the protocol and/or the ports utilized in association with the packet, the headers, ports or the like may be analyzed to determine if a qualified protocol is associated with the packet. For example, an internet protocol version 4 (IPv4) header may include protocol information that may be analyzed. Further, for example, the TCP/UDP headers may include the port numbers that may be analyzed. In this regard, the default DNS port may be 53, which may indicate that a qualified protocol is being utilized. In some exemplary embodiments, other protocols may also be utilized and identified as qualifying protocols.

As such if the criteria described above are met, then the packet may be qualified. Upon identifying a qualifying packet, a core device may determine that the core device has been selected as a default gateway by an edge device. Accordingly, the core device may be configured to save the address (e.g., IP address) of the edge device in a local gateway table. The address of the edge device may be stored as a local gateway table entry. The local gateway table entry may indicate the default gateway relationship between the edge device and the core device. In some exemplary embodiments, the local gateway table may be a local hash table or an edge device hash table (EDHT). A local gateway table may be a listing of some or all of the addresses of the edge devices that are using the core device as a default gateway. If a qualified packet is identified and the edge device's address is already located in the local gateway table, then the edge device address may remain in the local gateway table.

Upon determining that a edge device is utilizing a core device as a default gateway, the core device may be configured to update a routing table. In this regard, the core device may be configured to input an entry in a routing table indicating that a direct connection to the edge device exists and that communication to the edge device may be forwarded to the core device for routing to the edge device.

Referring to FIG. 3a, a default gateway has been determined for each edge device. In this regard, Core Device A has received a qualified packet indicating that Edge Device D is using Core Device A as a default gateway. Core Device B has received a qualified packet indicating that Edge Device E is using Core Device B as a default gateway. Further, Core Device C has received a qualified packet indicating that Edge Device F is using Core Device C as a default gateway. Additionally, the routing tables of core devices in FIG. 3a may indicate the default gateway relationship between the various edge devise and the respective core devices.

Having determined the default gateways for each edge device, a core device may share the default gateway relationships with some or all of the other core devices to facilitate communication routing to the edge devices. In this regard, the core devices may be configured to transmit the local gateway table, or some subset thereof, to some or all of the other core devices. In some embodiments, a core device may be configured to broadcast or multicast the local gateway table to some or all of the other core devices. In some exemplary embodiments, a core device may be configured to implement a timer, and when the timer elapses (i.e., reaches a threshold value), the local gateway table may be transmitted. Further, in some exemplary embodiments, when the local gateway table is transmitted, the local gateway table may be subsequently cleared of its contents. By clearing the local gateway table, the contents of the table may be repopulated by identifying additional qualified packets, and the contents of the local gateway table may remain fresh.

Upon receiving a gateway table from another core device (i.e., a remote gateway table), a core device may be configured to compare the entries of the remote gateway table with the entries of the local gateway table. In this regard, if an entry in a remote gateway table (indicating that the other core device is a default gateway for an edge device) matches an entry in the local gateway table (indicating that edge device is using the local core device as a default gateway), then the entry in the remote gateway table may be discarded or ignored, and no action need be taken. The occurrence of an edge device being identified as a default gateway for two core devices may occur as a result of movement of the edge device and timing of the local gateway table transmissions. Since, in some exemplary embodiments, local gateway transmissions may be transmitted based on the elapsing of a timer, but analysis of packets to find qualified packets may occur continuously, it may be determined that the contents of the local gateway table are more up to date that the contents of a remote gateway table. As such, if a match is found the matching entry may be discarded or ignored.

In instances where no match is found (i.e., an entry in the remote gateway table does not match an entry in the local gateway table), the routing table may be updated. The routing table may be updated such that when a communication is directed to an edge device, the core device may be configured to route the communication to the core device that is operating as the edge device's default gateway.

Referring now to FIG. 3b, representations of the transmissions of local gateway tables, or subsets thereof, are depicted. For example, having identified itself as the default gateway for Edge Device D, Core Device A transmits a communication to Core Device B and Core Device C indicating that Core Device A will forward data or communications to Edge Device D. Accordingly, Core Device B and Core Device C compare this information with their respective local gateway tables and determine that no match is identified. As such, Core Device B and Core Device C update their respective routing tables to indicate that communications to Edge Device D may be routed to Core Device A. Similar transmission and associated updating of routing tables are also depicted with respect to Core Device B and Core Device C.

Figure 4:
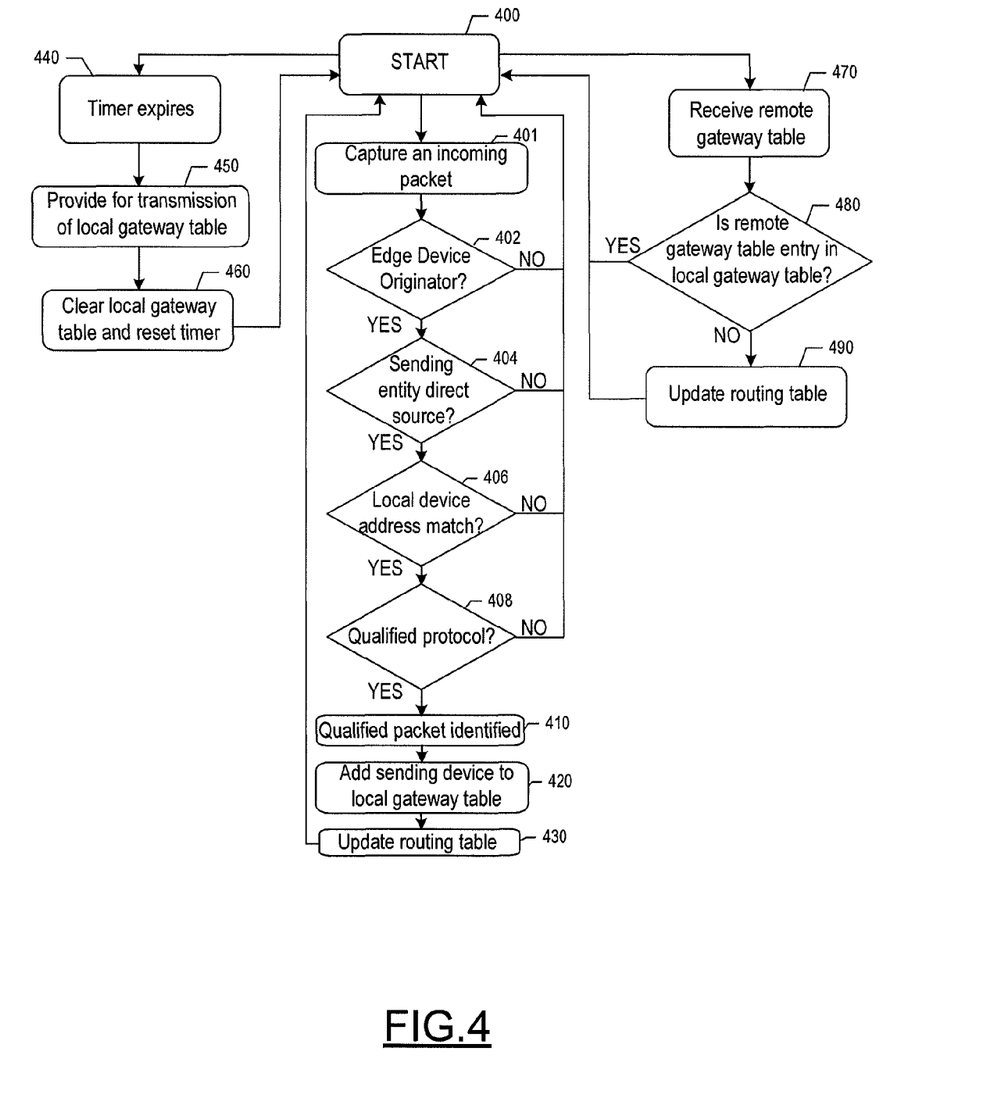
FIG. 4 is a flow chart of an exemplary method of determining communication routing according to exemplary embodiments of the present invention.

FIG. 4 illustrates a flow chart of an exemplary method that may be implemented by a core device in accordance with various embodiments of the present invention. The exemplary method may begin at 400. Note that the flow chart of FIG. 4 includes three legs (i.e., a leg beginning at 401, a leg beginning at 440, and a leg beginning at 470). It is contemplated that each of the legs of the exemplary method may be implemented separately, sequentially, and/or simultaneously.

At 401, a packet may be captured, and a determination of whether the packet is qualified may begin. At 402, a determination may be made as to whether an edge device was the originator or original source of the packet. If an edge device was not the originator of the packet, then the exemplary method may begin again at 400. If the packet originated from an edge device, then the determination may be made as to whether the packet was received directly from the sending entity at 404. If the packet was not received directly from the sending entity, then the exemplary method may begin again at 400. If the packet was received directly for the sending entity (i.e., an edge device sending entity), a determination may be made as to whether the local device address of the core device matches a destination address of the packet at 406. If core device is not the destination device (i.e., the local device address does not match the destination address), then the exemplary method may begin again at 400. If the core device is the destination device (i.e., the local device address matches the destination address), then a determination may be made as to whether a qualified protocol was used in association with the packet at 408. If protocol other than a qualified protocol was used in association with the packet, then the exemplary method may begin again at 400. If a qualified protocol was used, then a qualified packet may be identified at 410. At 420, the sending device and/or the sending device's address may be added to a local gateway table. Further, a routing table may be updated indicating that an edge device has been identified that has selected the core device to be a default gateway. The exemplary method may then begin again at 400.

At 440, a timer may expire because the timer reached a timer threshold. At 450, the exemplary method may include providing for transmission of the local gateway table, or some subset thereof, to, for example, other core devices. At 460, the local gateway table may be cleared and the timer may be reset.

At 470, a remote gateway table, or some subset thereof, may be received. At 480, a determination may be made as to whether an entry in the remote gateway table matches an entry in a local gateway table. If a match is identified, the exemplary method may begin again at 400. If no match is identified, the routing table may be updated indicating that another core device has been identified as a default gateway for an edge device.

Figure 5:
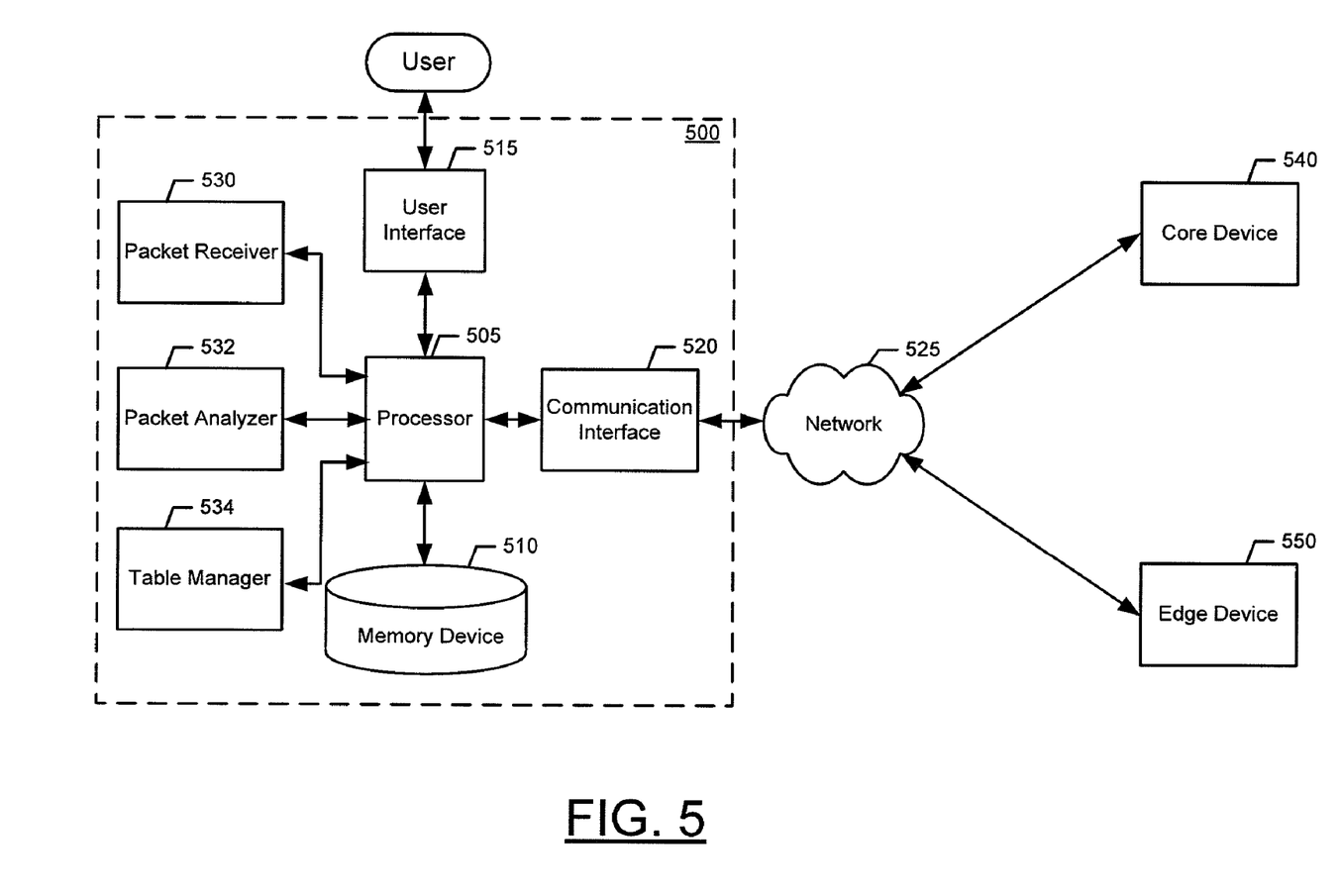
FIG. 5 illustrates an apparatus and associated network connectivity according to exemplary embodiments of the present invention.

Referring now to FIG. 5, an exemplary apparatus 500 for communication routing is described. According to various embodiments, the method of FIG. 4 may be implemented by an apparatus including a processor configured to implement the exemplary method of FIG. 4, such as, the apparatus 500 of FIG. 5. Apparatus 500 may be a core device as described herein or at least a portion of the core device. Further, apparatus 500, and in turn, the core device may be embodied as a server or other network device including, for example, a mobile terminal, such as mobile terminal 10 of FIG. 1, or the like. The apparatus 500 may include or otherwise be in communication with a processor 505, a user interface 515, a communication interface 520, and a memory device 510. The memory device 510 may include, for example, volatile and/or non-volatile memory (e.g., volatile memory 40 and/or non-volatile memory 42). The memory device 510 may be configured to store information, data, applications, instructions, or the like for enabling the apparatus to carry out various functions, such as those described in conjunction with the core device and illustrated by FIG. 4, FIG. 6 and/or FIG. 7, in accordance with exemplary embodiments of the present invention. For example, the memory device 510 could be configured to buffer input data for processing by the processor 505. Additionally or alternatively, the memory device 510 could be configured to store instructions for execution by the processor 505. As yet another alternative, such as the routing tables, memory device 510 may be one of a plurality of databases that store information in the form of static and/or dynamic information.

The processor 505 may be embodied in a number of different ways. For example, the processor 505 may be embodied as a microprocessor, a coprocessor, a controller (e.g., controller 20 from FIG. 1), or various other processing means or elements including integrated circuits such as, for example, an ASIC (application specific integrated circuit) or FPGA (field programmable gate array). In an exemplary embodiment, the processor 505 may be configured to execute instructions stored in the memory device 510 or otherwise accessible to the processor 505.

The user interface 515 may be in communication with the processor 505 to receive an indication of a user input at the user interface 515 and/or to provide an audible, visual, mechanical, or other output to the user. As such, the user interface 515 may include, for example, a keyboard, a mouse, a joystick, a touch screen display, a conventional display, a microphone, a speaker, or other input/output mechanisms. In an exemplary embodiment in which the apparatus 500 is embodied as a server, the user interface 515 may be limited, or even eliminated.

The communication interface 520 may be embodied as any device or means embodied in either hardware, software, or a combination of hardware and software that is configured to receive and/or transmit data from/to a network and/or any other device or module in communication with the apparatus 500. In this regard, the communication interface 520 may include, for example, an antenna, a transmitter, a receiver, a transceiver and/or supporting hardware or software for enabling communications with network 525, which may be any type of wired or wireless network. While network 525 may utilize a tiered structure, a peer-to-peer structure may also be implemented. Further, network 525 may be an SPN. Via the communication interface 520 and the network 525, the apparatus 500 may communicate with various entities that may be connected to the network 525 including another core device 540 and/or edge device 550. In some exemplary embodiments, core device 540 and/or edge device 550 may communicate directly with the apparatus 500 (i.e., without hopping through intermediate network entities).

The core device 540 may be any network entity as described herein for storing, retrieving, computing, transmitting, and receiving data. For example, core device 540 may be a wired or wireless access point, gateway, web server, database server, file server, or the like. The edge device 550 may also be any type of device for storing, retrieving, computing, transmitting and receiving data as described herein. For example, the edge device may be a wired or wireless personal computer, a mobile terminal, such as mobile terminal 10, or the like.

The packet receiver 530, the packet analyzer 532, and the table manager 534 of apparatus 500 may be any means or device embodied in hardware, software, or a combination of hardware and software that is configured to carry out the functions of the packet receiver 530, the packet analyzer 532, and the table manger 534 as described herein. In an exemplary embodiment, the processor 505 may include, or otherwise control the packet receiver 530, the packet analyzer 532, and the table manger 534. In various exemplary embodiments, the packet receiver 530, the packet analyzer 532, and the table manger 534 may reside on an entity remote from apparatus 500 such as a server, or other network device including a mobile terminal, such as mobile terminal 10 of FIG. 1.

According to various exemplary embodiments of the present invention, the packet receiver 530 may be configured to receive a packet. In this regard, the apparatus 500 may include various means for receiving the packet, which may include the processor 505, the packet receiver 530, and/or the like. Packet receiver 530 may receive the packet from an edge device, such as the edge device 550. In this regard, the packet may include a variety of information, such as an address of the sending entity. Further, in some embodiments, the packet receiver 530 may be configured to receive the packet from an SPN or entities within an SPN.

The packet analyzer 532 may be configured to identify the packet as a qualified packet. In this regard, the apparatus 500 may include various means for identifying the packet as a qualified packet, which may include the processor 505, the packet analyzer 532, and/or the like. In some exemplary embodiments, the packet analyzer 532 may be configured to identify the packet as a qualified packet by performing a series of inquiries. In this regard, the packet analyzer 532 may be configured to identify a network of the sending entity as being an edge device network. The packet analyzer 532 may also be configured to identify the sending entity as being a direct source of the packet. Further, the packet analyzer 532 may be configured to identify a device address as being a match with a local device address. In this regard, the device address may be included in the packet. The packet analyzer 532 may also be configured to identify a protocol associated with the packet as a qualified protocol. In this regard, in some exemplary embodiments, the packet analyzer may be configured to identify the protocol associated with the packet as a qualified protocol, where the qualified protocol may be TCP or DNS-over-UDP.

The table manager 534 may be configured to store a local gateway table entry in a local gateway table to thereby identify a local gateway relationship in response to identifying a qualified packet. The local gateway relationship may be the identification of a core device as a default gateway for an edge device (e.g., the edge device 550). In this regard, the apparatus 500 may include various means for storing the local gateway table entry, which may include the processor 505, the table manager 530, memory device 510, and/or the like. Further, the local gateway table entry may include the address of the sending entity, such as, for example, the edge device 550.

The table manager 534 may also be configured to update a routing table based on the local gateway table entry. In this regard, the apparatus 500 may include various means for updating the routing table, which may include the processor 505, the table manager 530, memory device 510, and/or the like.

According to some exemplary embodiments, the table manager 534 may also be configured to provide for transmission of the local gateway table in response to a timer reaching a timer threshold. Additionally, in some exemplary embodiments, the table manager 534 may also be configured to clear the local gateway table subsequent to providing for transmission of the local gateway table. Further, the table manager 534 may be configured to provide for transmission of the local gateway table by broadcasting the local gateway table to one or more core devices.

The table manager 534 may also be configured to receive a remote gateway table, the remote gateway table including a remote gateway table entry indicating a remote gateway relationship. In this regard, the apparatus 500 may include various means for receiving a remote gateway table, which may include the processor 505, the table manager 530, and/or the like. Further, the table manager 534 may also be configured to compare the remote gateway table entry with the local gateway table entry. In this regard, the apparatus 500 may include various means for comparing the remote gateway table entry with the local gateway table entry, which may include the processor 505, the table manager 530, and/or the like.

Additionally, in some exemplary embodiments, the table manager 534 may also be configured to update the routing table based on the remote gateway table entry if a match between the remote gateway table entry and the local gateway table entry is not identified. In this regard, the apparatus 500 may include various means for updating the routing table based on the remote gateway, which may include the processor 505, the table manager 530, and/or the like. Further the table manager 534 may also be configured to discard the remote gateway table entry if a match between the remote gateway table entry and a local gateway table entry is identified. In this regard, the apparatus 500 may include various means for discarding the remote gateway table entry, which may include the processor 505, the table manager 530, and/or the like.

Figure 6:
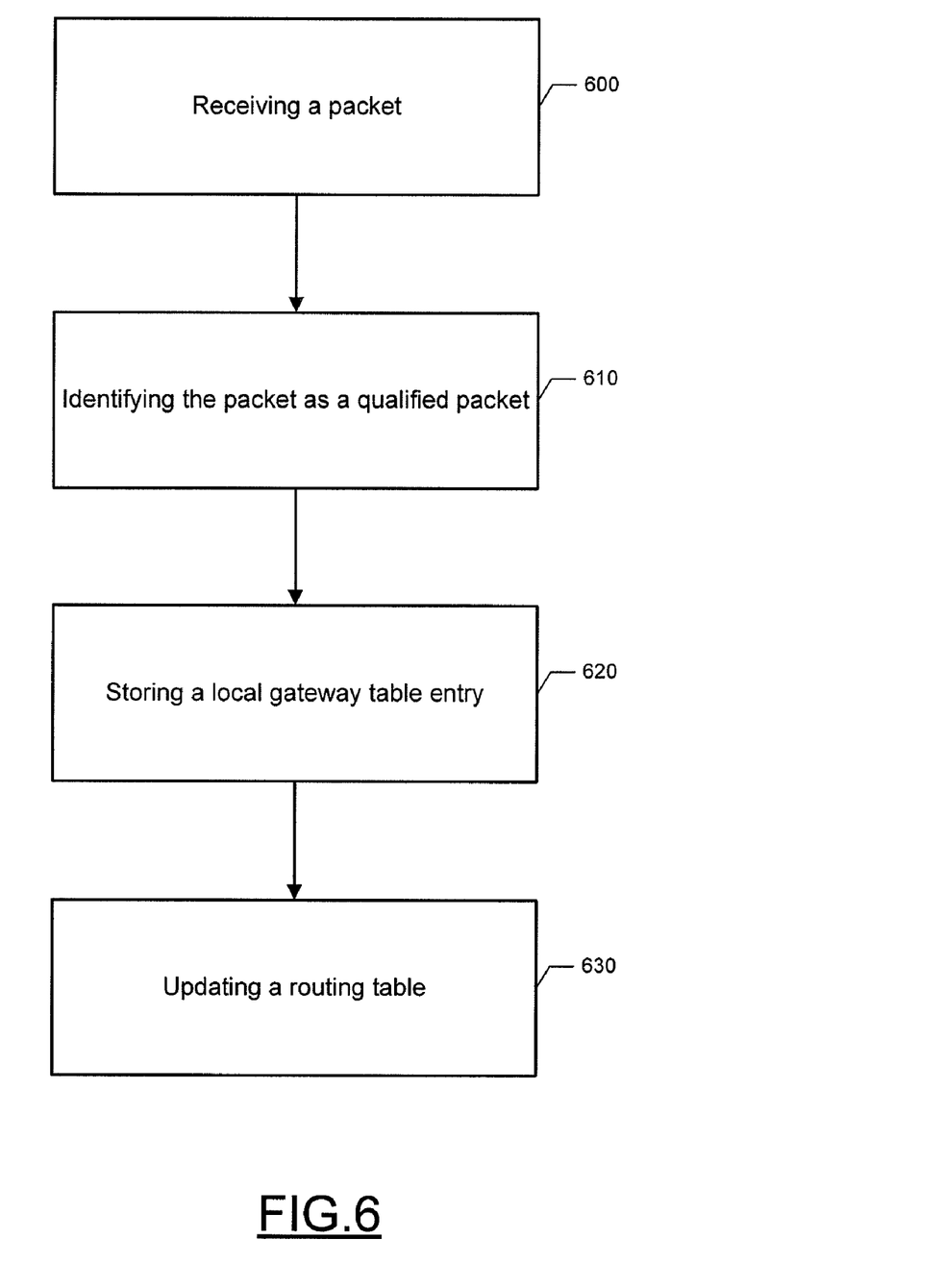
FIGS. 6 and 7 are flow charts of exemplary methods of determining communication routing according to exemplary embodiments of the present invention.

FIGS. 5 and 6, as well as FIG. 4, are flowcharts of a system, method, and program product according to exemplary embodiments of the invention. It will be understood that each block, step, or operation of the flowcharts, and combinations of blocks, steps or operations in the flowcharts, can be implemented by various means, such as hardware, firmware, and/or software including one or more computer program code portions, program instructions, or executable program code portions. For example, one or more of the procedures described herein may be embodied by computer program code instructions. In this regard, the computer program instructions which embody the procedures described herein may be stored by a memory device of the apparatus and executed by a processor in the apparatus. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block (s), step(s), or operation(s). These computer program instructions may also be stored in a computer-readable memory that can direct a computer, a processor, or other programmable apparatus to function in a particular manner, such that the instructions stored in the computer-readable memory produce an article of manufacture including instruction means which implement the function specified in the flowcharts block(s), step(s), or operation(s). The computer program instructions may also be loaded onto a computer, processor, or other programmable apparatus to cause a series of operational steps to be performed on the computer, processor, or other programmable apparatus to produce a computer-implemented process such that the instructions which execute on the computer, processor, or other programmable apparatus provide steps for implementing the functions specified in the flowcharts block(s), step(s), or operation(s).

Accordingly, blocks, steps, or operations of the flowcharts support combinations of means for performing the specified functions, combinations of steps for performing the specified functions and program instruction means for performing the specified functions. It will also be understood that one or more blocks, steps, or operations of the flowcharts, and combinations of blocks, steps, or operations in the flowcharts, can be implemented by special purpose hardware-based computer systems which perform the specified functions, steps, algorithms, or combinations of special purpose hardware and computer instructions.

In this regard, software implementing various exemplary aspects of the present invention may be configured as a standalone program on a core device, or part of another program on a core device, such as a plug-in. Some exemplary embodiments of the present invention may be implemented as an Optimized Link-State Routing (OLSR) plug-in.

In this regard, one exemplary embodiment of a method for communication routing as illustrated in FIG. 6 may include receiving a packet at 600. In this regard, the packet may include an address of a sending entity. Further, in some exemplary embodiments, receiving a packet may include receiving the packet from a social proximity network (SPN).

The exemplary method may also include identifying the packet as a qualified packet at 610. In some exemplary embodiments, identifying the packet as a qualified packet may include identifying a network of the sending entity as being an edge device network and identifying the sending entity as being a direct source of the packet. Further, identifying the packet as a qualified packet may also include identifying a device address as being a match with a local device address, the device address being included in the packet, and identifying a protocol associated with the packet as a qualified protocol. In this regard, identifying the protocol associated with the packet as a qualified protocol may include the qualified protocol being a transmission control protocol (TCP) or a domain name system over a user datagram protocol (DNS-over-UDP).

Further, the exemplary method of FIG. 6 may include storing a local gateway table entry in a local gateway table to thereby identify a local gateway relationship in response to identifying the qualified packet at 620. In this regard, the local gateway table entry may include the address of the sending entity. The exemplary method may also include updating a routing table based on the local gateway table entry at 630.

Figure 7:
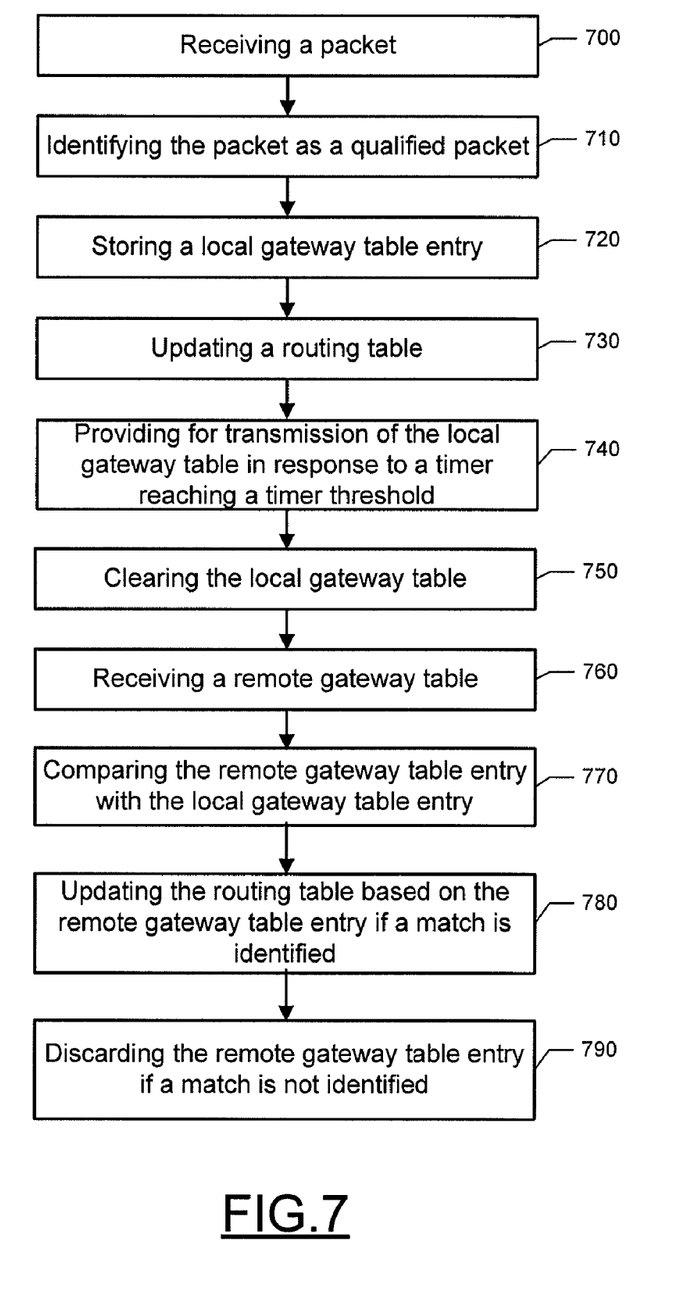

FIG. 7 depicts another exemplary method for communication routing according to an exemplary embodiment. In this regard, the ordering of the operations in the method of FIG. 7 is merely exemplary and other orderings of the operations are contemplated. Further, various operations included in the exemplary method of FIG. 7 may be optional.

The exemplary method of FIG. 7 may include receiving a packet at 700. In this regard, the packet may include an address of a sending entity. The exemplary method may also include identifying the packet as a qualified packet at 710. Further, the method may include storing a local gateway table entry in a local gateway table to thereby identify a local gateway relationship in response to identifying the qualified packet at 720. In this regard, the local gateway table entry may include the address of the sending entity. The exemplary method may also include updating a routing table based on the local gateway table entry at 730.

Further, the exemplary method of FIG. 7 may also include providing for transmission of the local gateway table in response to a timer reaching a timer threshold at 740. In this regard, in some exemplary embodiments, providing for transmission of the local gateway table may include broadcasting the local gateway table to one or more core devices. Further, the exemplary method may include clearing the local gateway table subsequent to providing for transmission of the local gateway table at 750.

In some exemplary embodiments, the exemplary method may include receiving a remote gateway table at 760. In this regard, the remote gateway table may include a remote gateway table entry indicating a remote gateway relationship. Further, the exemplary method may include comparing the remote gateway table entry with the local gateway table entry at 770 and updating the routing table based on the remote gateway table entry if a match between the remote gateway table entry and the local gateway table entry is not identified at 780. Additionally, the exemplary method may include discarding the remote gateway table entry if a match between the remote gateway table entry and the local gateway table entry is identified at 790.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving a packet, the packet including an address of a sending entity;
   identifying the packet as a qualified packet;
   storing a local gateway table entry in a local gateway table to thereby identify a local gateway relationship in response to identifying the qualified packet, the local gateway table entry including the address of the sending entity;
   providing for transmission of the local gateway table; and
   updating a routing table based on the local gateway table entry.

2. The method of claim 1, wherein receiving the packet includes receiving the packet from a social proximity network (SPN).

3. The method of claim 1, wherein identifying the packet as a qualified packet includes:
   identifying a network of the sending entity as being an edge device network;
   identifying the sending entity as being a direct source of the packet;
   identifying a device address as being a match with a local device address, the device address being included in the packet; and
   identifying a protocol associated with the packet as a qualified protocol.

4. The method of claim 3, wherein identifying the protocol associated with the packet as a qualified protocol includes the qualified protocol being a transmission control protocol (TCP) or a domain name system over a user datagram protocol (DNS-over-UDP).

5. The method of claim 1, wherein the providing for transmission comprises providing for transmission of the local gateway table in response to a timer reaching a timer threshold; and the method further comprises:
   clearing the local gateway table subsequent to providing for transmission of the local gateway table.

6. The method of claim 5, wherein the providing for transmission of the local gateway table further includes broadcasting the local gateway table to one or more core devices.

7. The method of claim 1 further comprising:
   receiving a remote gateway table, the remote gateway table including a remote gateway table entry indicating a remote gateway relationship;
   comparing the remote gateway table entry with the local gateway table entry;
   updating the routing table based on the remote gateway table entry if a match between the remote gateway table entry and the local gateway table entry is not identified; and discarding the remote gateway table entry if a match between the remote gateway table entry and the local gateway table entry is identified.

8. An apparatus comprising a processor, the processor configured to:
receive a packet, the packet including an address of a sending entity;
identify the packet as a qualified packet;
store a local gateway table entry in a local gateway table to thereby identify a local gateway relationship in response to identifying the qualified packet, the local gateway table entry including the address of the sending entity;
provide for transmission of the local gateway table; and
update a routing table based on the local gateway table entry.

9. The apparatus of claim 8, wherein the processor being configured to receive the packet includes being configured to receive the packet from a social proximity network (SPN).

10. The apparatus of claim 8, wherein the processor being configured to identify the packet as a qualified packet includes being configured to:
identify a network of the sending entity as being an edge device network;
identify the sending entity as being a direct source of the packet;
identify a device address as being a match with a local device address, the device address being included in the packet; and
identify a protocol associated with the packet as a qualified protocol.

11. The apparatus of claim 10, wherein the processor being configured to identify the protocol associated with the packet as a qualified protocol includes being configured to identify the protocol associated with the packet as a qualified protocol, the qualified protocol being a transmission control protocol (TCP) or a domain name system over a user datagram protocol (DNS-over-UDP).

12. The apparatus of claim 8, wherein the processor being configured to provide for transmission of the local gateway table includes being configured to:
provide for transmission of the local gateway table in response to a timer reaching a timer threshold; and
clear the local gateway table subsequent to providing for transmission of the local gateway table.

13. The apparatus of claim 12, wherein the processor being configured to provide for transmission of the local gateway table further includes being configured to broadcast the local gateway table to one or more core devices.

14. The apparatus of claim 13, wherein the processor is further configured to:
receive a remote gateway table, the remote gateway table including a remote gateway table entry indicating a remote gateway relationship;
compare the remote gateway table entry with the local gateway table entry;
update the routing table based on the remote gateway table entry if a match between the remote gateway table entry and the local gateway table entry is not identified; and
discard the remote gateway table entry if a match between the remote gateway table entry and a local gateway table entry is identified.

15. A computer program product comprising at least one computer-readable storage medium having executable computer-readable program code portions stored therein, the computer-readable program code portions comprising:
a first program code portion configured to receive a packet, the packet including an address of a sending entity;
a second program code portion configured to identify the packet as a qualified packet;
a third program code portion configured to store a local gateway table entry in a local gateway table to thereby identify a local gateway relationship in response to identifying the qualified packet, the local gateway table entry including the address of the sending entity;
a fourth program code portion configured to provide for transmission of the local gateway table; and
a fifth program code portion being configured to update a routing table based on the local gateway table entry.

16. The computer program product of claim 15, wherein the first program code portion configured to receive the packet includes being configured to receive the packet from a social proximity network (SPN).

17. The computer program product of claim 15, wherein the second program code portion configured to identify the packet as a qualified packet includes being configured to:
identify a network of the sending entity as being an edge device network;
identify the sending entity as being a direct source of the packet;
identify a device address as being a match with a local device address, the device address being included in the packet; and
identify a protocol associated with the packet as a qualified protocol.

18. The computer program product of claim 17, wherein the second program code portion configured to identify the protocol associated with the packet as a qualified protocol includes being configured to identify the protocol associated with the packet as a qualified protocol, the qualified protocol being a transmission control protocol (TCP) or a domain name system over a user datagram protocol (DNS-over-UDP).

19. The computer program product of claim 15, wherein the fourth program code portions further comprise:
a sixth program code portion configured to provide for transmission of the local gateway table in response to a timer reaching a timer threshold; and
a seventh program code portion configured to clear the local gateway table subsequent to providing for transmission of the local gateway table.

20. The computer program product of claim 19, wherein the fourth program code portion configured to provide for transmission of the local gateway table includes being configured to broadcast the local gateway table to one or more core devices.

* * * * *